Oct. 31, 1967     E. E. SMITH     3,349,592
APPARATUS FOR SUPPORTING OPTICAL SCANNING HEADS
Filed April 28, 1965     3 Sheets-Sheet 3
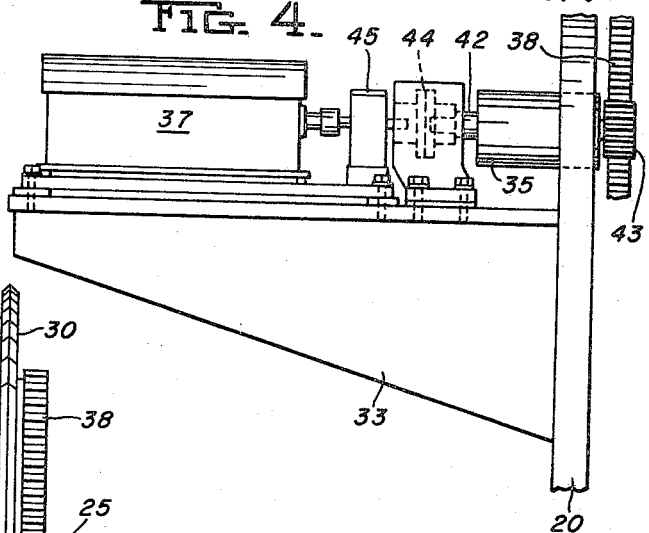
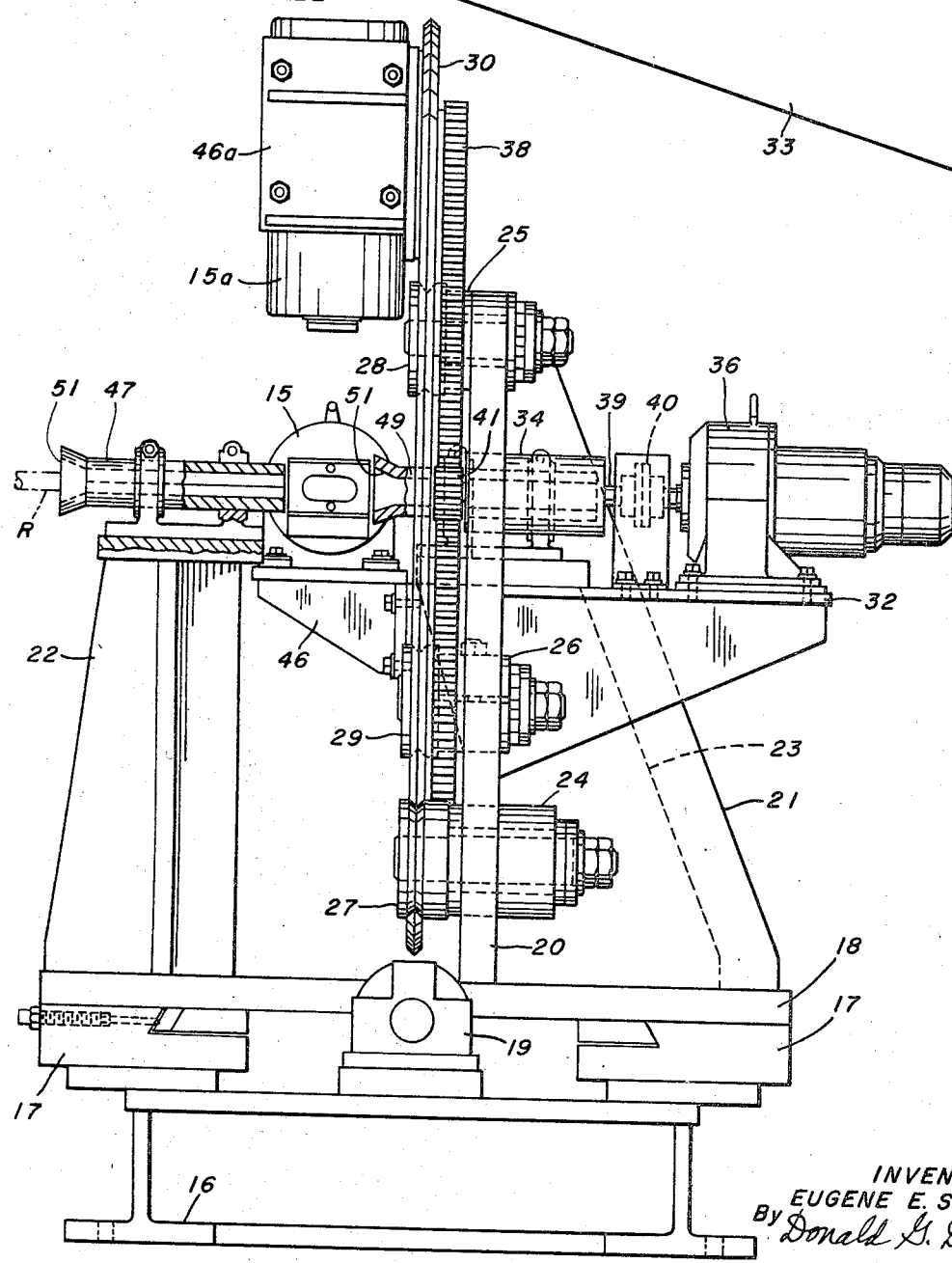
INVENTOR.
EUGENE E. SMITH
By Donald G. Dalton
Attorney

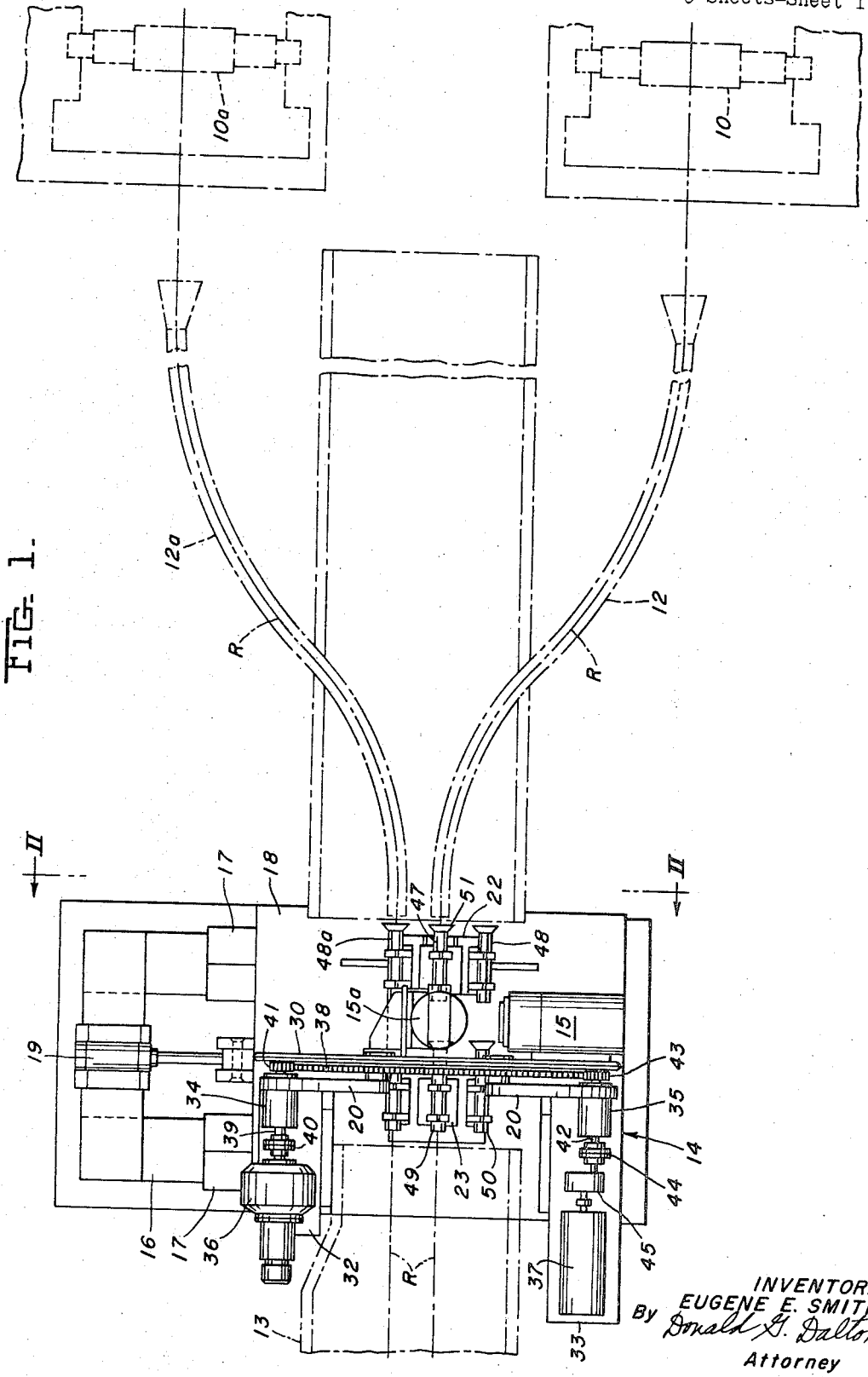

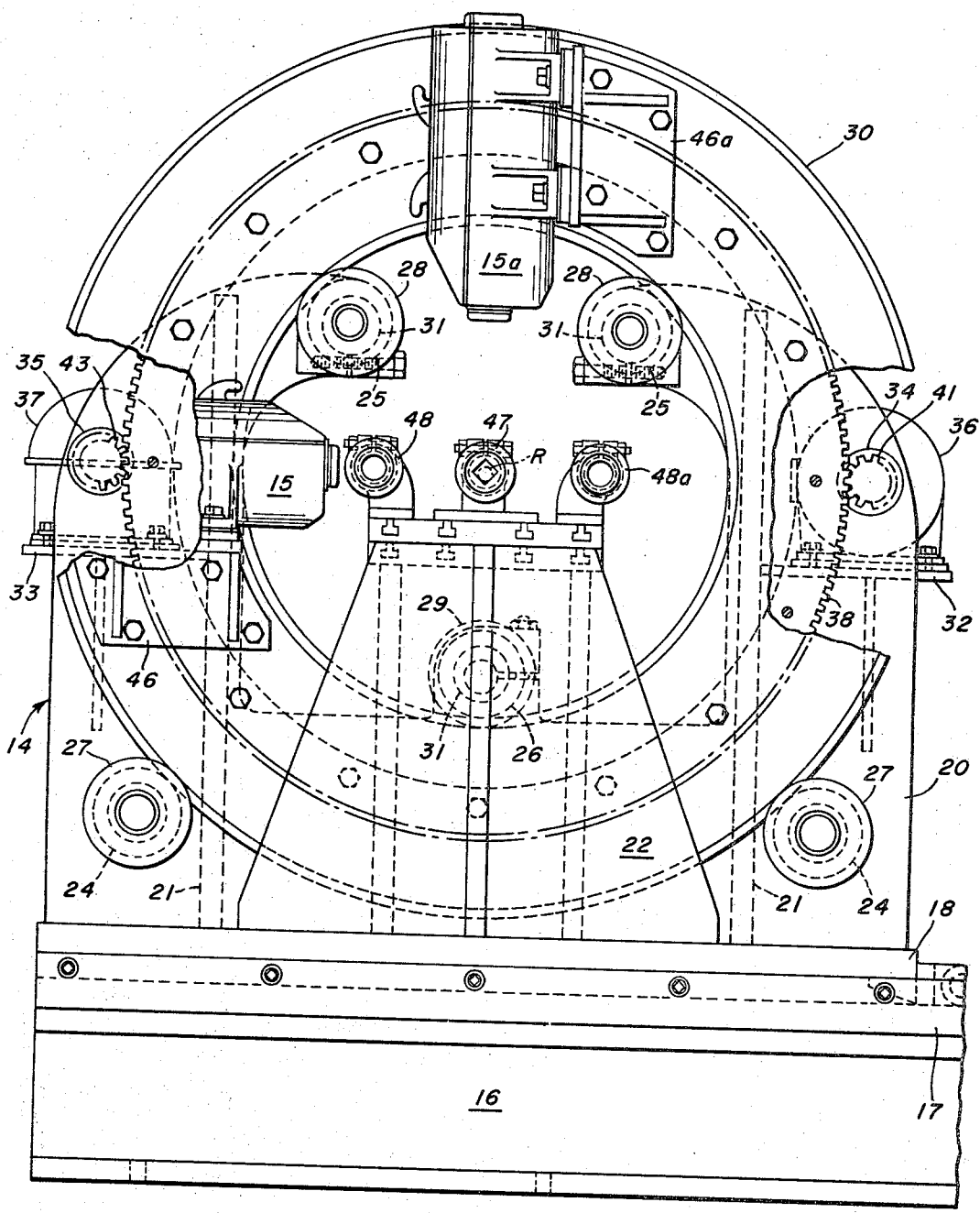

United States Patent Office 3,349,592
Patented Oct. 31, 1967

3,349,592
APPARATUS FOR SUPPORTING OPTICAL SCANNING HEADS
Eugene E. Smith, East Gary, Ind., assignor to United States Steel Corporation, a corporation of Delaware
Filed Apr. 28, 1965, Ser. No. 451,554
11 Claims. (Cl. 72—37)

ABSTRACT OF THE DISCLOSURE

An apparatus for supporting optical scanning heads used for checking the roundness of metal rods as they come from a rolling mill. Includes an annular plate rotatable about the rod axis and on which the scanning heads are mounted. Plate is motor driven through a 45° arc to swing the heads partially around the rod.

---

This invention relates to an improved apparatus for supporting optical scanning heads used in gauging steel rods.

Steel rods which are intended for certain uses must be rolled to close dimensional tolerances. For example, rods to be used in the manufacture of coil springs for automobiles commonly must not be more than 0.004 inch out of round. Optical devices are available commercially for gauging steel rods as they emerge from a hot-rolling mill traveling at relatively high speeds (1000 to 1200 feet per minute). Such devices include a pair of scanning heads directed radially toward the rod at right angles to each other and an electronic computing circuit to which the heads are connected. There have been problems in supporting such scanning heads to enable them to view the rod from the different angles required for a complete measurement, and also in steadying the rod for gauging without causing cobbles.

An object of the present invention is to provide an improved apparatus for supporting the scanning heads to overcome problems encountered previously.

A further object is to provide an improved apparatus which positively supports a pair of scanning heads directed radially toward a rod at right angles to each other, and which can move the heads circumferentially of the rod as needed to make a complete measurement.

A further object is to provide a supporting apparatus of the foregoing type which can accommodate rods emerging from either of two parallel rolling mills, gauging the rod from either mill while bypassing the rod from the other mill.

In the drawings:

FIGURE 1 is a partly diagrammatic top plan view of a supporting apparatus constructed according to my invention and positioned at the exit side of a pair of parallel rolling mills;

FIGURE 2 is a vertical section on a larger scale and with parts broken away on line II—II of FIGURE 1;

FIGURE 3 is a side elevational view of the apparatus from the right of FIGURE 2 and with parts broken away; and FIGURE 4 is a fragmentary elevational view from the left of FIGURE 2.

FIGURE 1 shows diagrammatically two conventional parallel hot-rolling mills 10 and 10a for steel rods R. A pair of guides 12 and 12a direct the rods from the respective mills to a runout table 13, from which the rods go to conventional cooling beds (not shown). A supporting apparatus 14 constructed in accordance with my invention carries a pair of conventional optical scanning heads 15 and 15a between the guides and the runout table.

As FIGURES 2 and 3 show, my supporting apparatus 14 has a fixed foundation 16, the upper face of which carries opposed parallel transverse horizontal slideways 17. I mount a base plate 18 on the slideways for sliding movement transversely of the rods R. The foundation 16 also carries a double-acting fluid pressure cylinder and piston 19, the piston rod of which I attach to the base plate 18 for moving the base plate along the sildeways 17 and thereby positioning it with respect to the rods. The base plate carries an upstanding U-shaped yoke 20, a pair of gussets 21 bracing said yoke, and front and back pedestals 22 and 23, all welded to the base plate to form a rigid structure. The front pedestal is on the side of the yoke facing the rolling mills 10 and 10a, and the back pedestal on the opposite side.

A pair of opposed lower hubs 24 are fixed to the lower portion of yoke 20, and a pair of opposed upper hubs 25 to the upper portion. An intermediate hub 26 is fixed to the mid portion of the yoke. A pair of grooved supporting rollers 27 are journaled in the respective lower hubs 24 on the front or entry side of the yoke. Similarly another pair of grooved supporting rollers 28 are journaled in the respective upper hubs 25, and a grooved hold-down roller 29 in the intermediate hub 26. An annular plate 30 is rotatably mounted on rollers 27 and 28, which engage its outer and inner circumferences respectively. The hold-down roller 29 also engages the inner circumference of the plate to hold the plate in position on its supporting rollers. Both circumferences of the plate have beveled edges which fit within the grooves of the respective rollers. The hubs 25 and 26 are equipped with eccentric bushings 31, whereby I can adjust the position of rollers 28 and 29 to hold the plate in its proper position, yet allow it to rotate freely about its central axis on the supporting rollers.

The back or exit face of yoke 20 carries a pair of opposed brackets 32 and 33 and bearing housings 34 and 35 above the respective brackets, all rigidly fixed thereto. I mount a conventional reversible drive motor 36 and a conventional rotary limit switch 37 on brackets 32 and 33 respectively (FIGURES 3 and 4). The limit switch is electrically connected to the motor to control its operation, as hereinafter explained. The motor is equipped with an automatic brake to stop it the instant it is deenergized, as known in the art. The back face of plate 30 carries a ring gear 38. Motor 36 drives the ring gear through a shaft 39, which is journaled in the bearing housing 34 and is connected to the motor through a coupling 40 and to the ring gear through a pinion 41. The ring gear drives the limit switch 37 through a shaft 42, which is journaled in the bearing housing 35 and is connected to the ring gear through a pinion 43 and to the limit switch through a coupling 44 and reduction gear unit 45. The front face of plate 30 carries two brackets 46 and 46a spaced 90° apart on which I mount the two scanning heads 15 and 15a respectively.

The front pedestal 22 carries a central guide sleeve 47 and two bypass guide sleeves 48 and 48a on opposite sides thereof. The back pedestal 23 carries guide sleeves 49 and 50 aligned respectively with the central guide sleeve 47 and the bypass guide sleeve 48, but spaced from the ends thereof. The other bypass guide sleeve 48a can be continuous, and I can support its rear portion on the back pedestal. The passages through both guide sleeves 47 and 49 are located on the axis of rotation of plate 30. These passages are square in cross section with the four vertices directed horizontally and vertically, except that they have flared entry sections 51.

In operation, I position the base plate 18 on its foundation 16 so that the aligned guide sleeves 47 and 49 are aligned with the exit end of one of the guides 12 or 12a. One of the bypass guide sleeves 48 or 48a is aligned with the other guide 12 or 12a. FIGURE 1 shows sleeves 47 and 49 aligned with guide 12 and sleeve 48a aligned with guide 12a. In the other position sleeves 47 and 49 would be aligned with guide 12a and sleeves 48 and 50 with guide 12. I operate cylinder 19 when I wish to move the parts between the two positions. In the position shown, each rod R coming from guide 12 enters the flared section 51 of the guide sleeve 47, travels through the square passage therein and through the guide sleeve 49. Each rod R coming from guide 12a travels through the bypass guide 48a.

The two scanning heads 15 and 15a are focused radially on the space between the aligned guide sleeves 47 and 49 where they can view the rod as it travels across this space. Since the bypass guide sleeves 48 and 50 are spaced end-to-end, there is no obstruction between the scanning head 15 and the rod. The square cross section of the passages through sleeves 47 and 49 assures that the rod is held reasonably steady as it travels across this space, yet allows enough clearance to permit rods with imperfections to travel unimpeded through the sleeves. The rod can wander as much as ⅛ inch without materially affecting the accuracy of the measurement. The drive motor 36 operates to rotate plate 30 about its axis and thus swing the two scanning heads about the rod. The limit switch 37 automatically controls motor 36 to swing the scanning heads according to any desired pattern. For example, I can set the limit switch so that the motor continuously oscillates the heads through a 45° arc as each rod from one of the mills 10 or 10a passes, or I can take occasional spot measurements from any angle. For most purposes it is sufficient to swing the heads through a 45° arc, although the apparatus is capable of swinging the heads around the full circumference of the rod. I make the bypass guide sleeve 48a continuous, since I do not ordinarily find it necessary to view the rod from this side. If a series of rods from one mill measure properly, I can shift the base plate 18 sideways to check rods from the other mill. Of course I do not perform a measurement while a rod is actually traveling through the bypass sleeves 48 and 50, since it would obstruct the view from the scanning head 15.

From the foregoing description it is seen that my invention affords a simple apparatus for supporting optical scanning heads to enable the heads to view a rod accurately from all angles needed for a complete measurement. The apparatus can be installed on existing equipment without otherwise altering the structure, and a single apparatus can be used for a plurality of rolling mills.

While I have shown and described only a single embodiment of my invention, it is apparent that modifications may arise. Therefore, I do not wish to be limited to the disclosure set forth but only by the scope of the appended claims.

I claim:

1. An apparatus for supporting optical scanning heads comprising a base, an upstanding yoke fixed to said base, an annular plate, means on said yoke supporting said plate for rotation about the central axis of said plate, a pair of angularly spaced brackets fixed to said plate for mounting scanning heads directed radially toward the central axis of said plate, guide means supported on said base to guide a member for gauging along the central axis of said plate, and drive means operatively connected with said plate.

2. An apparatus as defined in claim 1 in which the angular spacing between said brackets is 90°.

3. An apparatus as defined in claim 1 further comprising a foundation, slideways on said foundation on which said base is mounted for movement in a direction transversely of the central axis of said plate, and means for shifting said base along said slideways, whereby said guide means can be aligned with different parallel sources of members for gauging.

4. An apparatus as defined in claim 3 further comprising bypass guide means supported on said base for receiving members from one of the sources out of alignment with said first-named guide means.

5. An apparatus as defined in claim 1 in which the means supporting said plate includes an opposed pair of lower hubs fixed to said yoke, an opposed pair of upper hubs fixed to said yoke, an intermediate hub fixed to said yoke, supporting rollers journaled in said lower hubs and engaging the outer circumference of said plate, supporting rollers journaled in said upper hubs and engaging the inner circumference of said plate, and a hold-down roller journaled in said intermediate hub and engaging the inner circumference of said plate.

6. An apparatus as defined in claim 4 in which said rollers have grooves extending around their circumferences and in which the inner and outer circumferences of said plate have beveled edges received in the grooves.

7. An apparatus as defined in claim 1 in which said guide means includes an upstanding pedestal fixed to said base and a pair of axially spaced aligned guide sleeves fixed to said pedestal, said sleeves having openings which are square in cross section with the four vertices directed vertically and horizontally and which openings have flared ends for receiving the members, the space between said sleeves being opposite the scanning heads.

8. An apparatus as defined in claim 1 in which said drive means includes a ring gear fixed to said plate, a bracket fixed to said yoke, a reversible electric drive motor mounted on said last-named bracket, and a pinion driven by said motor and meshing with said gear.

9. An apparatus as defined in claim 8 further comprising a rotary limit switch supported on said yoke and driven by said ring gear, said switch being connected to said motor to control the operation thereof.

10. The combination, with a hot-rolling mill for steel rods and a pair of optical scanning heads for gauging the rods, of a supporting apparatus for said heads, said apparatus comprising a base located at the exit side of said mill, an upstanding yoke fixed to said base, an annular plate, means supporting said plate on said yoke for rotation about the central axis of said plate, the central axis of said plate being aligned with the path of rods emerging from said mill, a pair of brackets fixed to said plate, said heads being mounted on said brackets and spaced 90° apart and directed radially toward the central axis of said plate, guide means supported on said base to guide rods along the central axis of said plate, and drive means operatively connected with said plate.

11. The combination, with a pair of parallel hot-rolling mills for steel rods, guides for carrying rods from the respective mills, and a pair of optical scanning heads for gauging the rods, of a supporting apparatus for said heads, said apparatus comprising a foundation located at the exit end of said guides, transverse slideways on said foundation, a base mounted on said slideways for movement in a direction transversely of said guides, an upstanding yoke fixed to said base, an annular plate, means on said yoke supporting said plate for rotation about its central axis, the central axis of said plate being aligned with one of said guides, a pair of brackets fixed to said plate, said heads being mounted on said brackets and spaced 90° apart and directed radially toward the central axis of said plate, guide means supported on said base to guide rods along the central axis of said plate, drive means operatively connected with said plate, and means operatively connected with said base for shifting it between positions in which the central axis of said plate is aligned with either of said first-named guides.

References Cited

UNITED STATES PATENTS

| | | | |
|---|---|---|---|
| 2,859,603 | 11/1958 | Edelman et al. | 88—14 |
| 2,933,956 | 4/1960 | Snow | 72—13 |
| 3,225,202 | 12/1965 | Rich | 250—83.3 |
| 3,290,913 | 12/1966 | Wilson | 72—12 |

CHARLES W. LANHAM, *Primary Examiner.*

A. RUDERMAN, *Assistant Examiner.*